(12) United States Patent
Frisch et al.

(10) Patent No.: US 8,781,158 B1
(45) Date of Patent: Jul. 15, 2014

(54) UVB-VISIBLE CHANNEL APPARATUS AND METHOD FOR VIEWING A SCENE COMPRISING TERRESTRIAL CORONA RADIATION

(71) Applicant: Ofil, Ltd., Nes Ziona (IL)

(72) Inventors: Eran Frisch, Neve Daniel (IL); Odelya Koslovsky, Jerusalem (IL); Reuel Haavrahami, Beit Shemesh (IL)

(73) Assignee: Ofil, Ltd., Nes Ziona (IL)

( * ) Notice: Subject to any disclaimer, the term of this patent is extended or adjusted under 35 U.S.C. 154(b) by 0 days.

(21) Appl. No.: 14/151,885

(22) Filed: Jan. 10, 2014

(51) Int. Cl.
| | |
|---|---|
| *G06K 9/00* | (2006.01) |
| *G06K 9/62* | (2006.01) |
| *G06K 9/36* | (2006.01) |
| *G01J 3/50* | (2006.01) |
| *G06K 7/10* | (2006.01) |
| *G02B 5/22* | (2006.01) |
| *G02B 27/28* | (2006.01) |

(52) U.S. Cl.
CPC ..................................... *G02B 27/28* (2013.01)
USPC ........... 382/100; 382/224; 382/284; 250/226; 359/350; 359/885

(58) Field of Classification Search
USPC ........... 382/100, 224, 284; 250/226; 359/350, 359/885
See application file for complete search history.

(56) References Cited

U.S. PATENT DOCUMENTS

| | | | |
|---|---|---|---|
| 3,748,471 A * | 7/1973 | Ross et al. | ..................... 250/333 |
| 4,731,881 A | 3/1988 | Geller | |
| 4,752,824 A | 6/1988 | Moore | |
| 4,835,391 A | 5/1989 | Hartemann et al. | |
| 5,001,348 A * | 3/1991 | Dirscherl et al. | ............. 250/372 |

(Continued)

FOREIGN PATENT DOCUMENTS

| | | |
|---|---|---|
| CA | 2211490 | 1/1998 |
| CN | 101726693 | 6/2010 |

(Continued)

OTHER PUBLICATIONS

Lindner, M.; Elstein, S.; Lindner, P.; Topaz, J. M.; Phillips, A.J., "Daylight corona discharge imager," High Voltage Engineering, 1999. Eleventh International Symposium on (Conf. Publ. No. 467), vol. 4, no., pp. 349,352 vol. 4, 1999.*

(Continued)

*Primary Examiner* — Utpal Shah
(74) *Attorney, Agent, or Firm* — Marc Van Dyke; 4th Dimension IP

(57) ABSTRACT

A UVB-visible hybrid system and method for visualizing a scene comprising one of more terrestrial corona discharge(s) and one or more objects is disclosed. On the UVB channel, an object-devoid UVB image of at least a portion of the scene is generated using UVB light which passes though a corona-peak tuned optical filter configured to filter out sufficient non-terrestrial-corona light so that the generated UVB image is object-devoid. The object-devoid UVB image is analyzed to classify pixels thereof as corona-discharge pixels or non-corona-discharge pixels. When a derivative of the object-devoid UVB image superposed with a visible-band image of the scene is displayed on a display device, the pixels classified as corona-discharge are displayed at increased visibility, while the pixels classified as corona-discharge are displayed at decreased visibility. In some embodiments, the optical filter has an average optical density over the [290 nm, 700 nm] spectrum of at least 4.

15 Claims, 16 Drawing Sheets

(56) References Cited

U.S. PATENT DOCUMENTS

| | | | |
|---|---|---|---|
| 5,021,668 A | | 6/1991 | Talmore et al. |
| 5,079,416 A | | 1/1992 | Filipovich |
| 5,107,333 A | | 4/1992 | Poque et al. |
| 5,148,023 A | | 9/1992 | Hayashi et al. |
| 5,468,963 A | | 11/1995 | Bishop |
| 5,535,053 A | * | 7/1996 | Baril et al. .................... 359/409 |
| 5,555,324 A | | 9/1996 | Waxman et al. |
| 5,574,286 A | | 11/1996 | Huston et al. |
| 5,677,532 A | | 10/1997 | Duncan et al. |
| 5,687,034 A | | 11/1997 | Palmer |
| 5,719,567 A | | 2/1998 | Norris |
| 5,790,188 A | | 8/1998 | Sun |
| 5,841,574 A | | 11/1998 | Willey |
| 5,886,344 A | * | 3/1999 | Forsyth .................... 250/214 VT |
| 6,104,297 A | * | 8/2000 | Danilychev .................... 340/600 |
| 6,150,652 A | * | 11/2000 | Forsyth .................... 250/214 VT |
| 6,323,491 B1 | * | 11/2001 | Forsyth .......................... 250/372 |
| 6,476,396 B1 | * | 11/2002 | Forsyth .......................... 250/372 |
| 6,994,885 B2 | * | 2/2006 | Pong et al. .................... 427/162 |
| 7,157,710 B1 | * | 1/2007 | Shannon .................. 250/339.05 |
| 7,732,782 B2 | | 6/2010 | Thorsted |
| 8,405,719 B2 | * | 3/2013 | Shong et al. .................. 348/135 |
| 8,649,932 B2 | * | 2/2014 | Mian et al. .................. 250/316.1 |
| 2006/0043296 A1 | * | 3/2006 | Mian et al. .................... 250/330 |
| 2011/0273560 A1 | | 11/2011 | Shong et al. |

FOREIGN PATENT DOCUMENTS

| | | |
|---|---|---|
| CN | 103308833 | 9/2013 |
| EP | 0651233 | 5/1995 |
| GB | 2278435 | 11/1994 |
| WO | WO0005536 | 2/2000 |

OTHER PUBLICATIONS

Czech, T., A. T. Sobczyk, and A. Jaworek. "Optical emission spectroscopy of point-plane corona and back-corona discharges in air." The European Physical Journal D 65.3 (2011): 459-474.

PCT Preliminary Examination Report for PCT/IL1999/000381, Title: "Solar Blind UV Viewing Apparatus and Camera", filed Jul. 12, 1999, Aug. 24, 2000.

Partial Image File Wrapper for U.S. Appl. No. 09/744,148 "Solar blind uv viewing apparatus and camera"—file wrapper between Feb. 26, 2001 and Sep. 8, 2008.

Partial File wrapper of European patent application EP 99929681.7, Titled "Solar Blind UV Viewing Apparatus and Camera", File wrapper between dates Feb. 3, 2000 and Nov. 7, 2012.

Lefeuvre, G., P. Gorodetzky, and P. Salin. "Measurement of the absolute fluorescence yield in Nitrogen between 0.5 and 2.3 MeV." International Cosmic Ray Conference. vol. 8. 2005.

Title: "Photon yields from nitrogen gas and dry air excited by electrons", authors: M. Nagano et al., published in 2003 by Elsevier Science.

Title: "Ultraviolet (UV) emissions from a unipolar submicrosecond pulsed dielectric barrier discharge (DBD) in He-Air mixtures", published in 2007 by the Journal of physics.

Title: "A Technique for the Optical Detection and Analysis of Dry Band Arcs on a Composite Insulator", authors: G. P. Bruce et al., published in 2008 by the Annual Report Conference on Electrical Insulation Dielectric Phenomena.

Title: "Design of UV-Visible Dual-spectrum Image Fusion System Based on DSP Technology", authors: Wei Li et al., published in 2009 by IEEE.

Title: "Detection of Point-plane Corona Discharges Using the Solar Blind Photosensitive Tube", authors: Ting Cui et al., from Proceedings of ICEMS2008 from 11th International Conference on Electrical Machines and Systems Oct. 17-20, 2008 Wuhan, China.

Title: "Multisegmented, multilayer-coated mirrors for the Solar Ultraviolet Imager", authors: Dennis Martinez-Galarce et al., published in 2013 by SPIE.

Title: "The Characteristics of UV Strength According to Corona Discharge From Polymer Insulators Using a UV Sensor and Optic Lens", authors: Youngseok Kim et al., published in 2011 by IEEE.

"The design and evaluation of a multi-spectral imaging camera for the inspection of transmission lines and substation equipment," Proc. 2005 World Insulator Congress and Exhibition in Hong Kong, China. 2005.

Title: "Ultraviolet Image Processing Method in Corona Detection", by Yin Limin et al., 2009 Second International Workshop on Computer Science and Engineering.

Title: "Intelligent High-voltage Discharge Fault Detection and Its Diagnosis Methods Based on ANN", by Xu Ru-jun, Ma Li-xin, Hu Bo et al., 2011 International Symposium on Intelligence Information Processing and Trusted Computing.

Title: "Non-contact Discharge Detection System for High Voltage Equipment Based on Solar-blind Ultraviolet Photomultiplier", by Wang Shenghui et al., 2010 International Conference on Measuring Technology and Mechatronics Automation.

Machine-translation of CN101726693 (Google patents)—translation downloaded on Mar. 25, 2014.

Machine-translation of CN103308833 (Google patents)—translation downloaded on Mar. 25, 2014.

* cited by examiner

UVB-VISIBLE CHANNEL APPARATUS AND METHOD FOR VIEWING A SCENE COMPRISING TERRESTRIAL CORONA RADIATION

FIELD

The present invention relates to methods and apparatus for viewing corona terrestrial discharge(s) in the context scene object(s).

BACKGROUND

FIG. 1 illustrates UVB corona absorption peaks, including peaks at 283 nm, 297 nm, 316 nm, 337 nm, and 353 nm.

SUMMARY OF EMBODIMENTS

The present inventors are now disclosing a UVB/visible hybrid viewing device for viewing terrestrial corona discharges associated with one or more objects in scene. Within the scene are one or more corona-emitting objects (e.g. electrical equipment), one or more terrestrial corona discharges, and optionally one or more non-corona objects (e.g. tables, chairs, etc). The presently-disclosed optical and image-processing features make the device and method particularly useful for viewing corona-discharges in 'daytime/indoor' situations—i.e. in the presence of a relatively-low but not insignificant level of solar radiation.

A 'terrestrial corona' discharge is in contrast to solar corona discharges.

The presently-disclosed device and method are based upon the combination of several features: (i) the use of a specialized, highly-absorptive optical filter configured to generate an 'object-devoid' UVB image; (ii) analyses of this object-devoid UVB image to classify pixels thereof as either 'corona discharge pixels' or 'non-corona discharge pixels' and (iii) display to a user of a hybrid overlay/superposition display of both UVB and visible-band images in a manner which increases a visibility of the corona-discharge pixels and/or decreases a visibility of the non-corona-discharge pixels.

The present disclosure relates to imaging of a scene comprising objects and one or more terrestrial-corona discharges to produce an 'object-devoid' UVB image of the scene. For the present disclosure, an 'object-devoid' UVB image of this scene only includes a UVB image of the corona discharge, and optionally noise, with no image of any of the objects in the scene. Thus, by definition, none of the objects that are visible to the naked eye in the actual scene appear within the object-devoid UVB image. As discussed below, the object-devoid UVB image may be generated by employing a corona-tuned optical filter (i) having an extremely high optical density (e.g. OD of at least 4, or at least 6, or at least 8, or at least 10) for at least 95% or at least 97% of the [280 nm, 700 nm] spectrum and (ii) having a low optical density (i.e. less than 1) for at least one wavelength within 10 nm of one or more of the UVB corona peaks.

The object-devoid UVB image in-and-of-itself may lack utility for viewing corona discharges in their proper context of the neighboring objects of the scene. Nevertheless, when the object-devoid UVB image (or a derivative thereof) superposed over a visible image of the scene, it is possible, for the first time, to view the corona discharge in its 'neighboring context' despite the fact that none of these 'neighboring objects' are present within the UVB image.

Because the UVB image generated with the intention to superpose with the visible image, it is possible to generate the UVB image in a manner that is extremely corona-specific to view weaker coronas. The 'price' of generating a UVB image devoid of objects is that the UVB image may no longer be used to provide context data, due to the lack of objects therein. The present inventors are now disclosing a hybrid device where this 'price' is irrelevant because the visible-band image now serves this function.

Because the UVB image is, in fact, object-devoid, it is possible to assume that the non-corona-discharge thereof pixels do not provide meaningful information—i.e. are not required to display background objects to provide proper context to the image of the corona-discharge. Because the non-corona pixels of the UVB image represent noise rather than necessary object-background objects (i.e. required for providing context to the corona discharge), it is possible to (A) classify pixels of the UVB image as (i) corona-discharge pixels or (ii) non-corona-discharge pixels. The displaying of the hybrid UVB-visible image on the display device may be performed in a manner that increases a visibility of the terrestrial-corona pixels and decreases a visibility of the non-corona pixels. For example, the non-corona pixels may be effectively 'erased' from the hybrid UVB-visible image.

When the highly-absorptive optical filter filters out the light, it effectively eliminates all objects from the UVB image to generate an object-devoid image. However, the device does not need to rely on the UVB image/channel to display the objects to give 'visual context' to the corona discharge—instead, the visible-band channel provides this functionality. By relying on the visible-channel to properly display the 'corona-discharge context' it is possible to employ the highly-absorptive specialized optical filter that eliminates objects from the UVB image in order to properly view even 'weak' corona discharges, to provide a greater sensitivity to coronas.

It is now disclosed a system for visualizing a scene comprising one or more terrestrial corona discharge(s) and one or more objects, the scene illuminated by non-terrestrial-corona-discharge radiation, the method comprising: a. UVB image-generating apparatus configured to generate, from UVB light of the non-terrestrial-corona-discharge-radiation-illuminated scene, an object-devoid UVB image of at least an object-containing portion of the scene, the object-devoid UVB image comprising an image of the corona discharge(s) of the scene and lacking images of all of the scene objects, the UVB image-generating apparatus comprising a wavelength-dependent light filter configured to filter out sufficient non-corona UVB radiation so that generated image is object-devoid, the wavelength-dependent light filter having an optical-density OD($\lambda$) profile that satisfies the following conditions: i. an average value of min [OD($\lambda$),10] over the range [280 nm, 700 nm] is at least x, a value of x being at least 4 (or at least 5 or at least 6 or at least 7 or at least 8 or at least 9 or at least 10 or at least 12); ii. for at least one wavelength in at least one range selected from the UVB corona-peak range set defined as {[281 nm, 285 nm], [292 nm, 302 nm], [308 nm, 320 nm], [334 nm, 340 nm], [351 nm, 362 nm]}, optical density OD of the filter is at most 1; b. UVB image-processing apparatus operative to classify each pixel of the object-devoid UVB image as either a corona-discharge pixel or as a non-corona-discharge pixel and to process the object-devoid image according to the results of the pixel-classifying to generate a UVB processed image; c. a visible-band image-generating apparatus configured to generate a visible-band image from visible light of the scene; d. video-display apparatus configured to display a visible band-UVB hybrid image that is a superposition of: (i) the visible-band image or a derivative thereof; and (ii) the UVB processed image or a derivative thereof, the UVB image-processing apparatus configured to perform the image processing so as to increase a visibility of the corona-discharge pixels and/or to decrease a visibility of the non-corona-discharge pixels.

In some embodiments, the UVB image-processing apparatus is configured to respond to a change in an estimated ambient level of non-corona-discharge UVB radiation by modifying a corona-discharge-classification-threshold-function of the pixels to increase the threshold-function in response to an increase in the estimated ambient level and to decrease the threshold-function in response to an estimated decrease in the ambient level.

In some embodiments, the system is configured to obtain the estimated intensity of ambient non-corona-discharge UVB radiation in accordance with at least one of: (i) an auxiliary photodetector; (ii) location data; (iii) time-of-day; and (iv) weather data.

In some embodiments, the system is configured to estimate the ambient level of non-corona-discharge UVB radiation by analyses of the object-devoid UVB image.

In some embodiments, the pixel classification is performed in accordance with detected temporal variations in the object-devoid UVB image.

Alternatively or additionally, the pixel classification of a target pixel is performed in accordance with analysis of neighboring pixels.

Alternatively or additionally, the pixel classification of a target pixel is performed in accordance with a brightness-thresholding algorithm.

In some embodiments, for at least 5 nm of wavelength over the UVB corona-peak range set, an optical density OD of the filter is at most 1.

In some embodiments an average value of min [OD($\lambda$),10] over the range [400 nm, 700 nm] is at least y, a value of y being at least 4 or at least 6 or at least 8 or at least 10.

In some embodiments an average value of min [OD($\lambda$),10] over the range [280 nm, 400 nm] is at least y, a value of y being at least 4 or at least 6 or at least 8 or at least 10.

DESCRIPTION OF EMBODIMENTS

The invention is herein described, by way of example only, with reference to the accompanying drawings. With specific reference now to the drawings in detail, it is stressed that the particulars shown are by way of example and for purposes of illustrative discussion of the preferred embodiments of the exemplary system only and are presented in the cause of providing what is believed to be a useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice and how to make and use the embodiments.

For brevity, some explicit combinations of various features are not explicitly illustrated in the figures and/or described. It is now disclosed that any combination of the method or device features disclosed herein can be combined in any manner—including any combination of features—any combination of features can be included in any embodiment and/or omitted from any embodiments.

Figure 1:
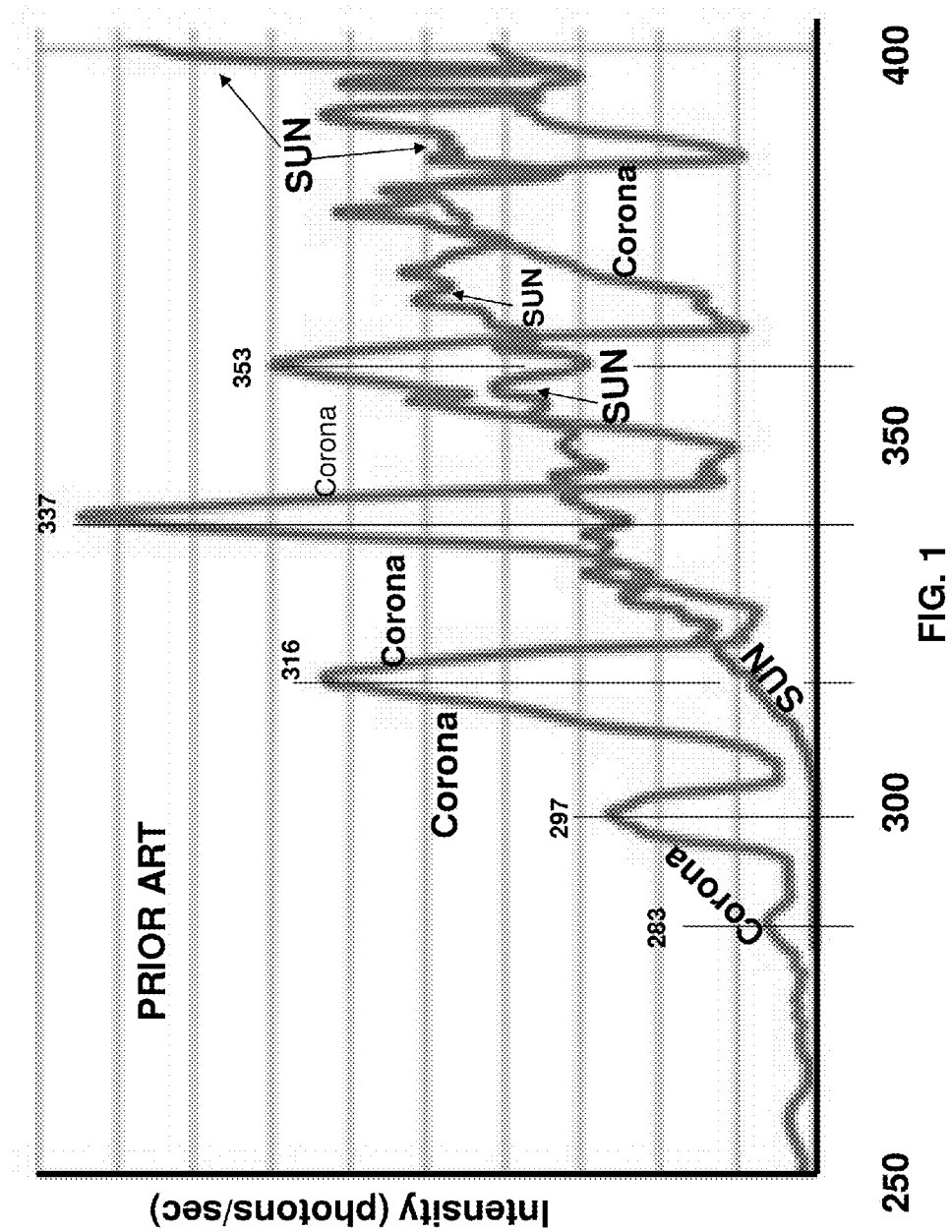
FIG. 1 illustrates UVB corona peaks (prior art).
Figure 2:
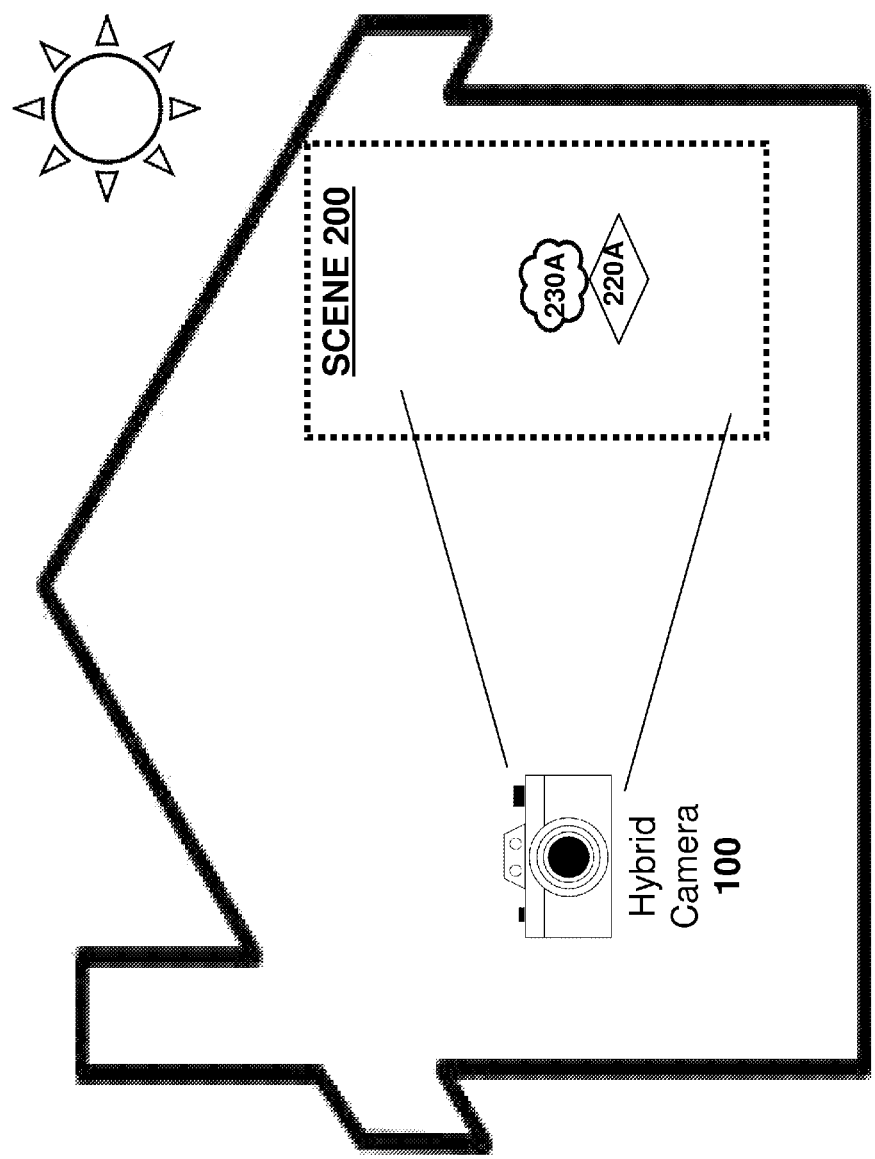
FIG. 2 illustrates the imaging of a scene including terrestrial corona by a UVB-visible band hybrid imaging device under daytime-indoors conditions.
Figure 3:
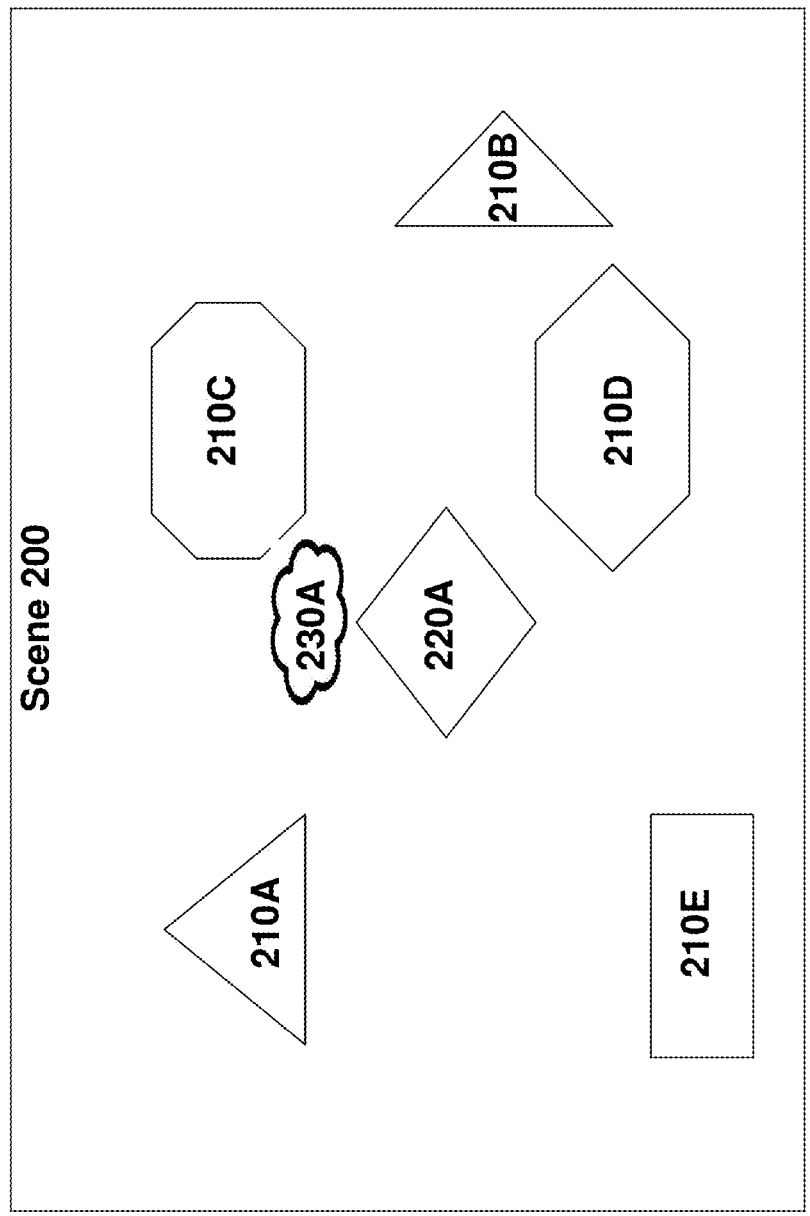
FIG. 3 is a schematic illustration of a scene including visible objects and a terrestrial corona discharge.

FIG. 2 is a side-view illustration (i) a scene 200 including a corona-emitting object 220A that is visible to the naked eye and a corona-discharge 230A that is invisible to the naked eye and (ii) a UVB-visible band hybrid device 100 for imaging the scene 200. FIG. 3 is a view of the scene from the perspective of hybrid device 100. The scene includes both non-corona objects 210A-210E (e.g. tables, chairs, etc) as well as the corona-emitting object 220A, all of which are visible to the naked eye. For simplicity, the non-corona objects 210A-210E are not illustrated in FIG. 2.

Figure 4:
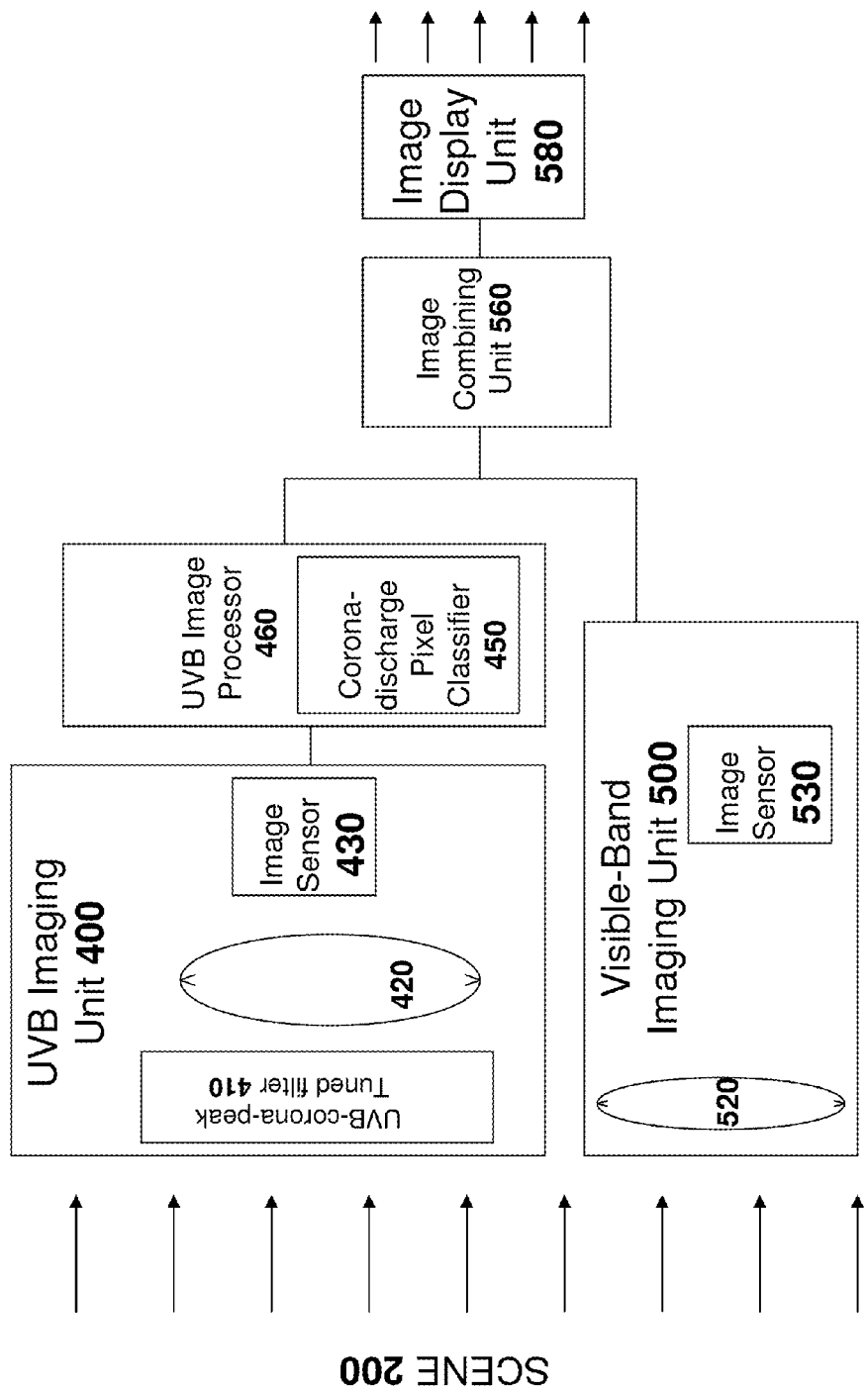
FIG. 4 is a block diagram of an exemplary UVB-visible band hybrid imaging device.

A schematic of an exemplary UVB-visible band hybrid device 100 is illustrated in FIG. 4. Light from scene 200 is received both by (i) UVB imaging unit 400 which generates an object-devoid UVB image of at least a portion of scene 200 and (ii) visible-band imaging unit 500 which generates a visible-band image of at least the portion of the scene 200. After the object-devoid UVB image is processed by image processor 460, the processed UVB image is combined with the visible-band image by image combining unit 560 to form a UVB-visible band hybrid image, which is displayed by image display unit 580. The hybrid image may be formed electronically or optically or in any other manner.

One salient feature of the device 100 is that a presence of UVB-corona-peak tuned filter 410 within image unit 400 means that the UVB image formed by lens 420 and image sensor 430 is object-devoid—i.e. is devoid of all images within scene 200. Instead, the UVB image includes an image of the corona 230 and optionally noise. In the hypothetical absence of filter 410, the image generated by imaging unit 400 would, in fact, images of the objects 210, 220 of the scene. The skilled artisan is referred to the discussion below with reference to FIGS. 11A-11E about the physical properties of UVB-corona-peak tuned filter 410 that enable generation of the object-devoid filter. For example, as discussed below, the optical filter 410 may have an average optical density over the [290 nm, 700 nm] spectrum of at least 4.

Figure 5:
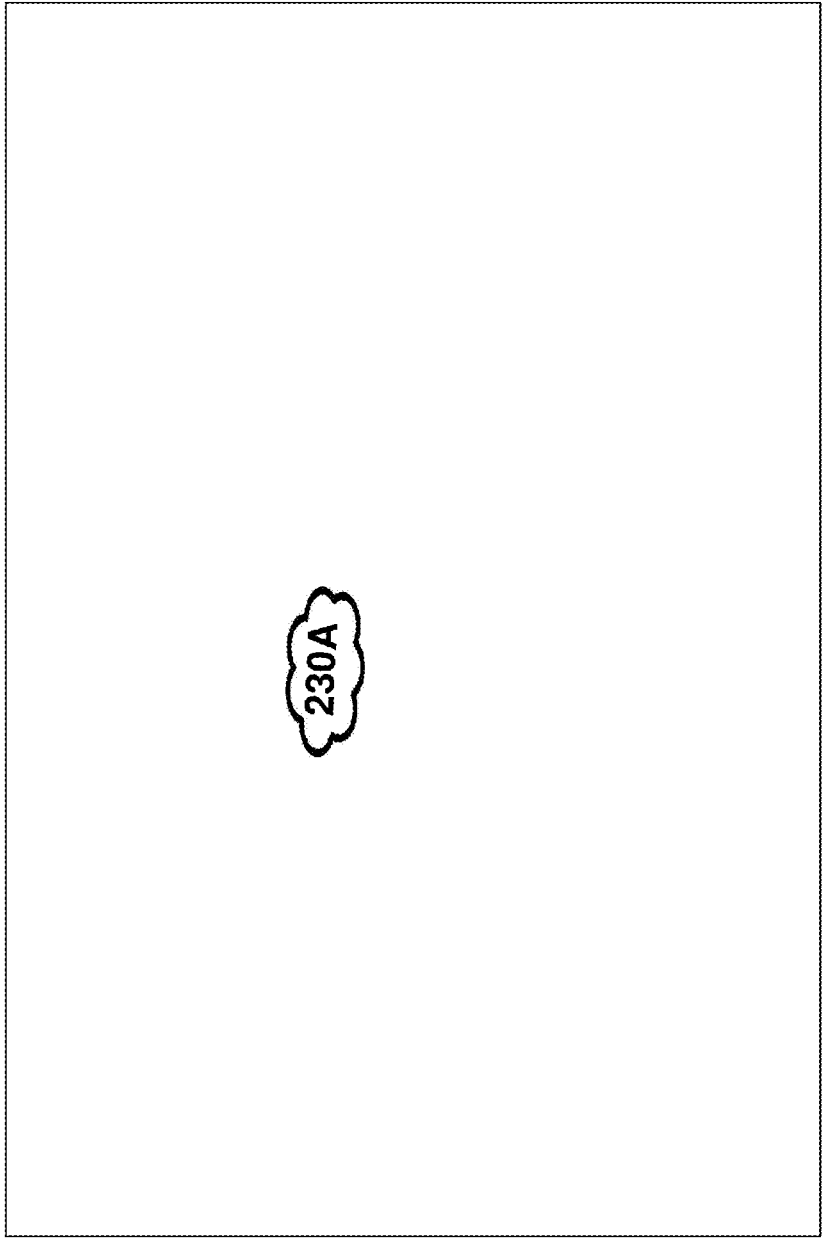
FIG. 5 is a schematic illustration of an object-devoid UVB image of the scene of FIG. 3.

FIG. 5 is a schematic of an object-devoid UVB image of the scene 200 of FIG. 2 generated by UVB imaging unit 400. Thus, none of objects 210A-210E, 220A are present within the object-devoid UVB image of FIG. 5. However, corona 230B discharge is present in this UVB image.

Figure 6:
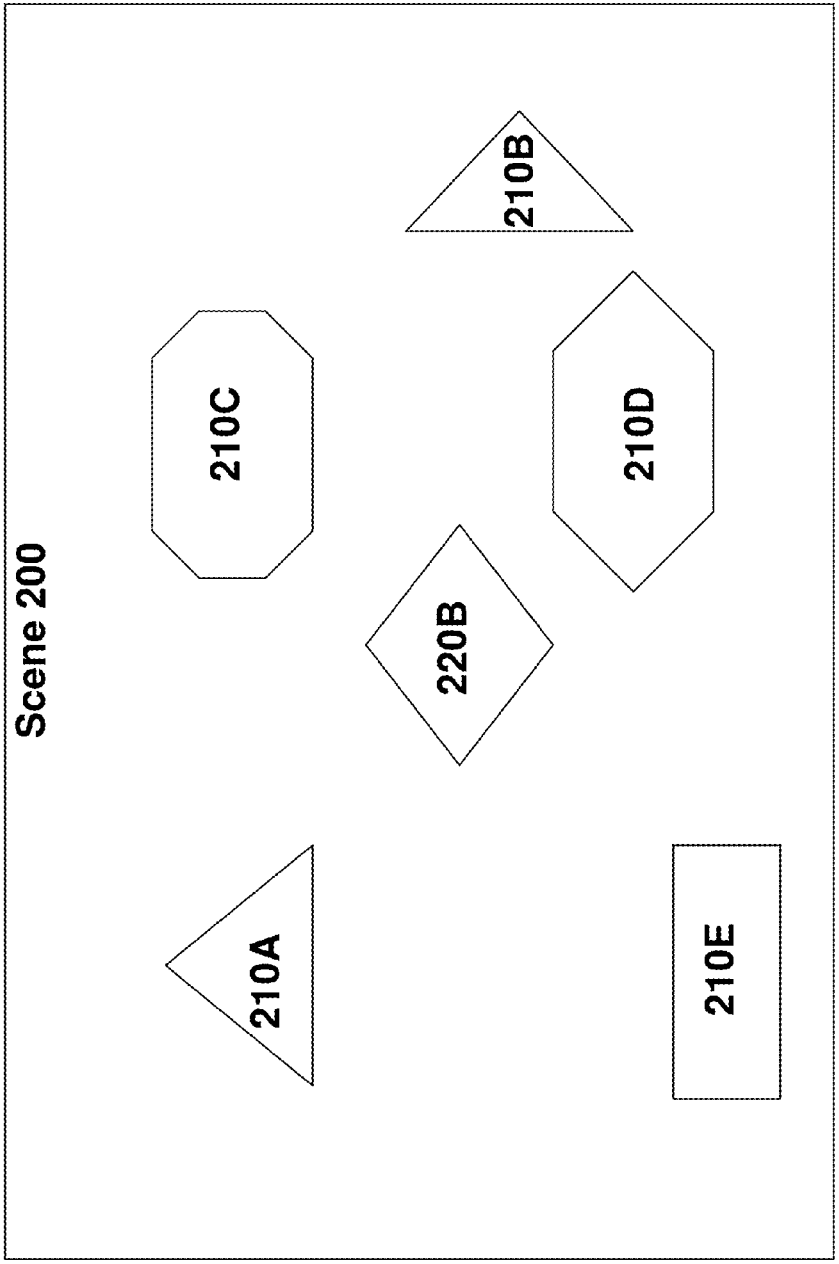
FIG. 6 is a schematic illustration of a visible-band image of the scene of FIG. 3.

In contrast, FIG. 6 illustrates a schematic of the visible-band image of scene 200 of FIG. 2 as generated by visible-band imaging unit 500.

Also illustrated in FIG. 4 are: (i) lens 420 which is transparent to UVB light; (ii) UVB sensitive image sensor 430 (for example, CMOS or CCD or including any other appropriate technology); (iii) lens 520 which is transparent to visible light; and (iv) visible-band image sensor 530 (for example, CMOS or CCD image intensifier or including any other appropriate technology).

Once the object-devoid UVB image (see FIG. 5) is combined with the visible-band image (see FIG. 6) by image combining unit 560, it is possible to view both objects as well as corona on display unit 580. This allows for viewing the corona-discharge in its proper context of neighboring objects 210, 220—for example, see FIG. 7.

Figure 7:
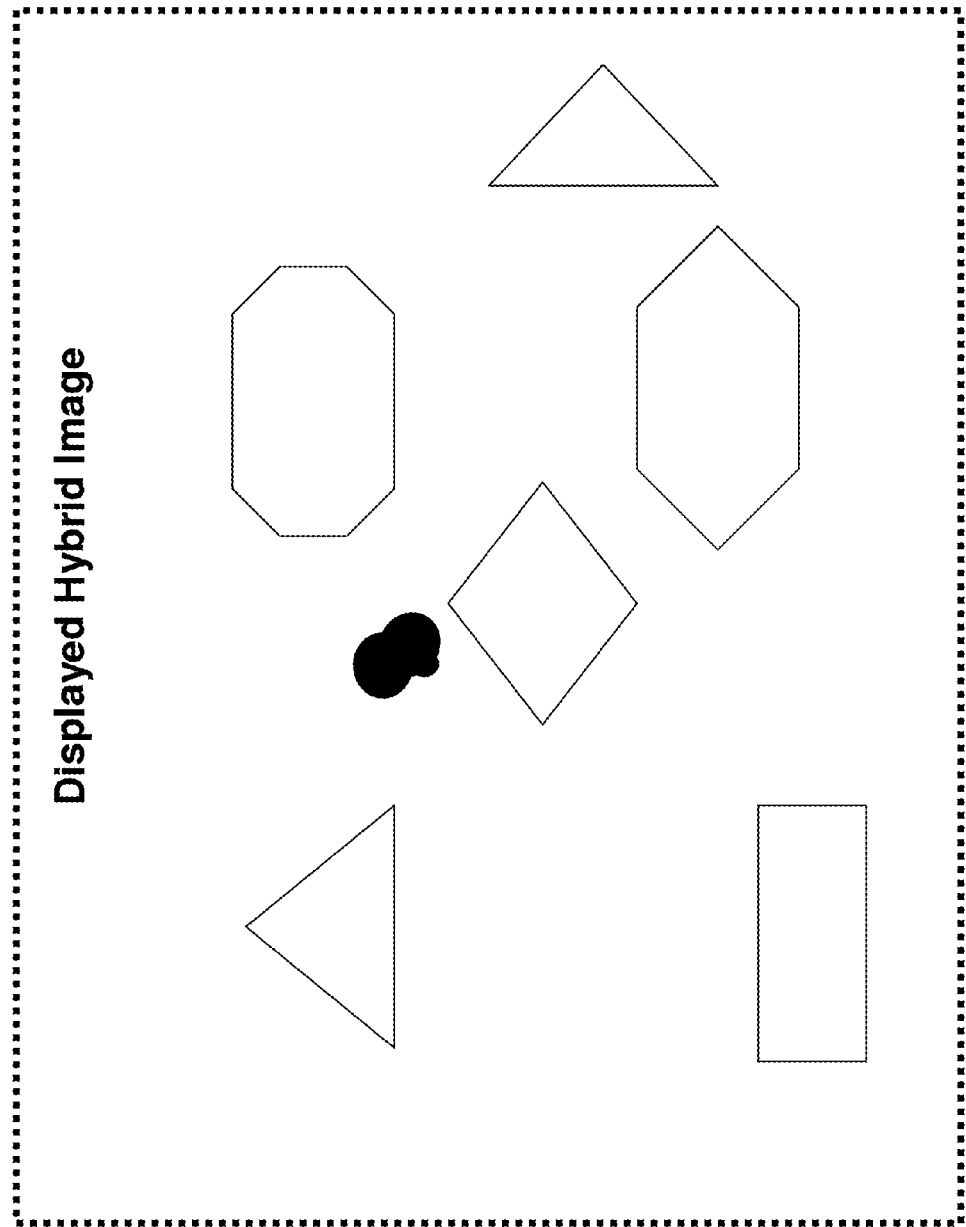
FIG. 7 is a schematic illustration of UVB-visible hybrid image of the scene of FIG. 3.

In order to obtain the result of FIG. 7, the presently-disclosed UVB-visible band hybrid viewing device 100 employs a combination of the following features (i) wavelength-dependent features of UVB filter 410 (see the discussion below with reference to FIGS. 11A-11E); and (ii) corona-specific image processing 460 based on classification of pixels of the object-devoid UVB image as either corona-discharge pixels or as non-corona-discharge pixels 450.

Figure 8:
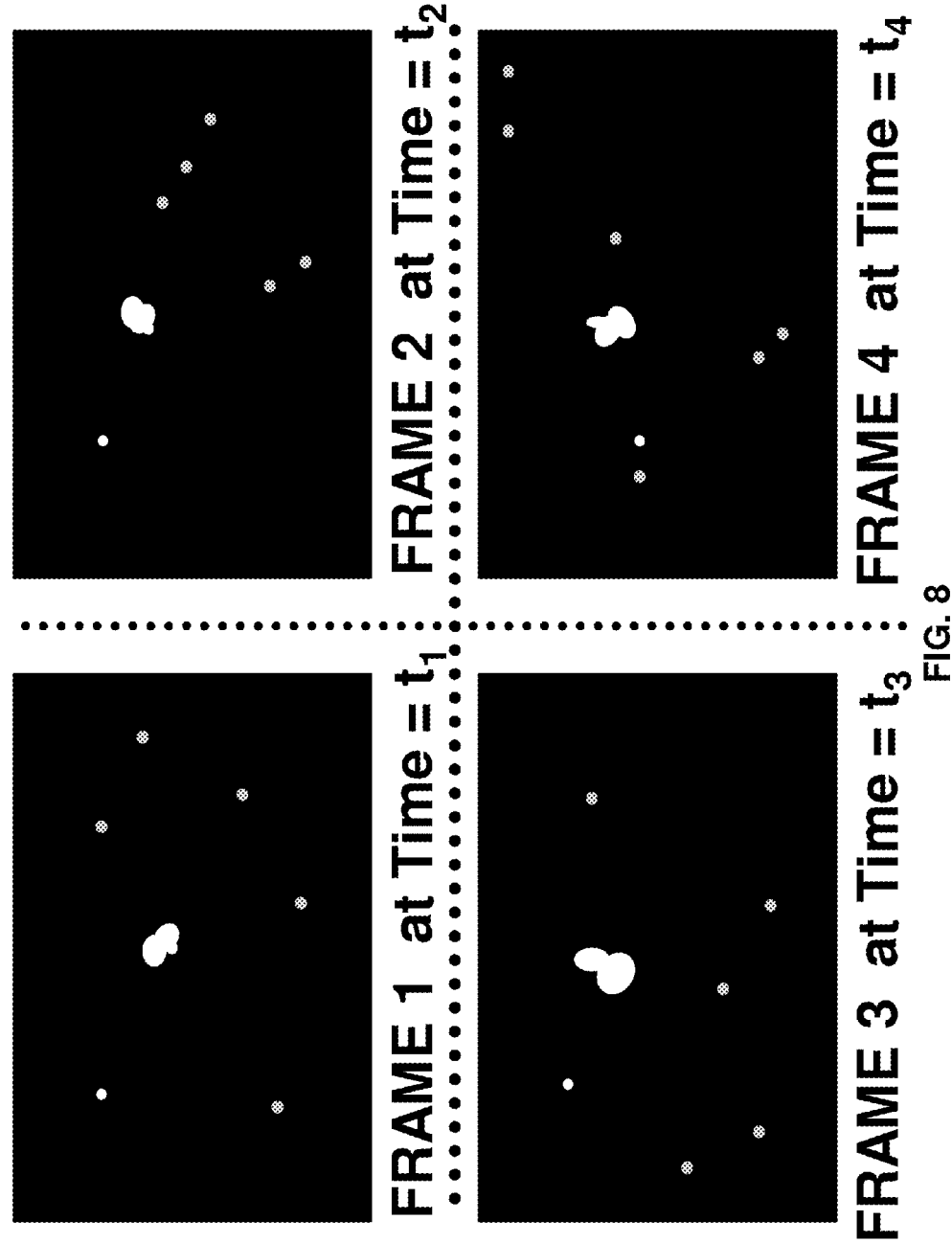
FIGS. 8-10 relate to image processing algorithm to a classification of pixels of the object-devoid UVB image.

This image processing will now be discussed with reference to FIGS. 8-10. In particular, FIG. 8 illustrates an example of object-devoid images of scene 200 generated by imaging unit 400 for four points in time—t1, t2, t3, and t4. Towards the center of each image is an image of corona. Clearly, there is no image of any object in any of the four images. However, in addition to the image of the corona there may be noise present within the object-devoid UVB image—see the slightly darker grey dots. Although the specific shape of the corona-discharge does vary as a function of time, its location and general shape are relatively constant compared to the noise. In contrast, location of the noise dots clearly varies in time.

With further reference to FIG. 8, it is noted that because of the optical properties of filter 410, it may be assumed that non-corona-discharge pixels are in fact noise and are not 'object pixels' of objects 210, 220 that must be preserved in order to provide 'image context' for hybrid-image displayed by unit 580 (e.g. see FIG. 7). There is no need to preserve these non-corona images—the context information is provided by the visible-band image generated by unit 500.

As such, it is possible to (i) classify each pixel as either a corona-discharge pixel or as a non-corona-discharge pixel and (ii) a non-corona discharge pixel. For example, this may be performed by classifier 450. Image processing unit 460 may modify the contents of the object-devoid UVB image so that once the hybrid image is displayed by unit 580, (i) a visibility of the corona-discharge pixels is increased and/or to (ii) a visibility of the non-corona-discharge pixels is decreased.

Figure 9:
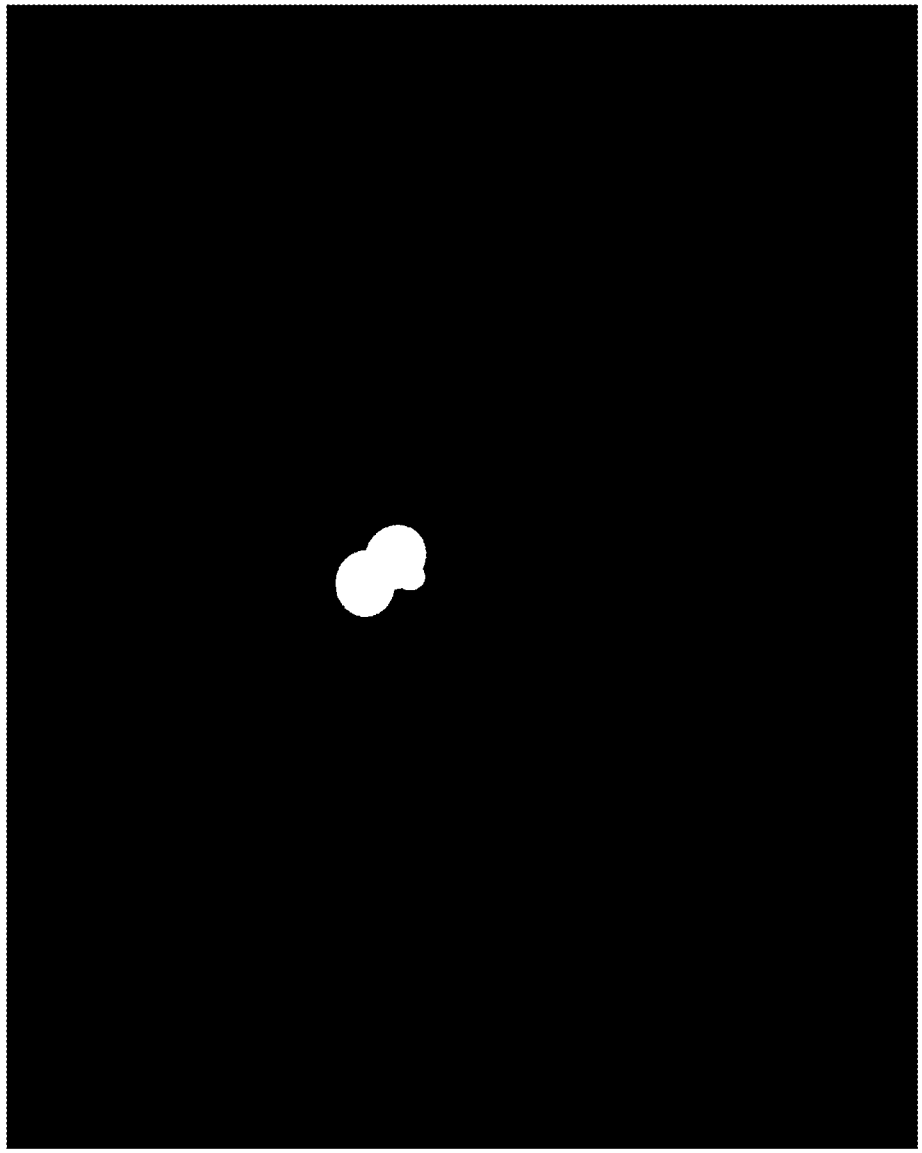

A schematic of the results of such a corona-discharge-classification-based UVB-image-processing routine is illustrated in FIG. 9 where the 'noise pixels' are removed and modified to blend with their surrounding pixels to make them less visible. The Corona image in FIG. 9 relates to a some sort of average shape over [t1,t4] time interval.

Comparing FIG. 9 to FIG. 8, it is clear that the grey non-corona-discharge pixels are less visible (in this case, substantially erased) in FIG. 9 compared to FIG. 8 in this case, the pixels classified as 'non-corona-discharge pixels' may have 'null data' so as to be invisible in the hybrid pixel. Alternatively or additionally, it is possible to brighten the corona-discharge pixels. In another example, a color of the corona-discharge pixels may be modified in the hybrid image to make them more visible. In another example, a boundary may be drawn around the corona-discharge pixels to make them more visible in the hybrid image. These measures may be performed according to the results of the pixel classifying.

Figure 10:
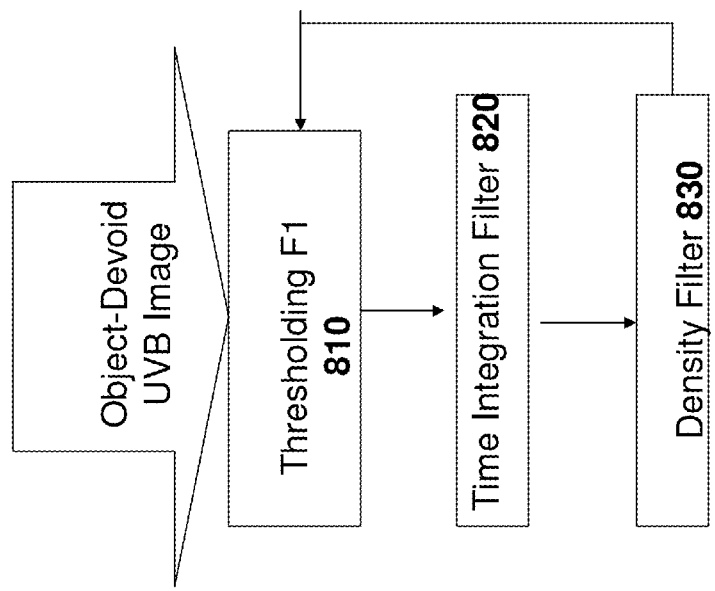
Figure 11A:
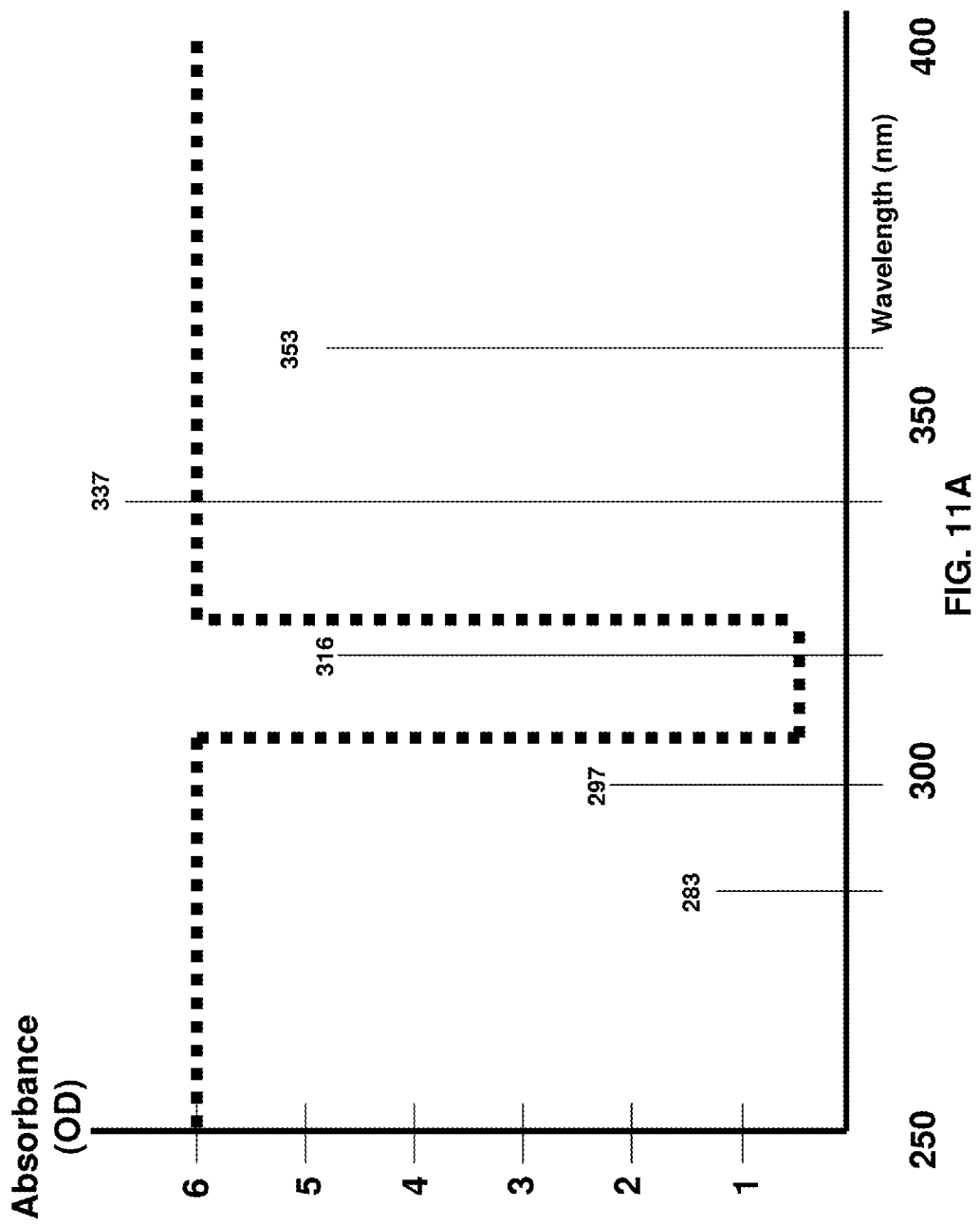
FIGS. 11A-11E illustrate example optical-density profiles in the UVB range for a UVB-corona-peak tuned filter.
Figure 11B:
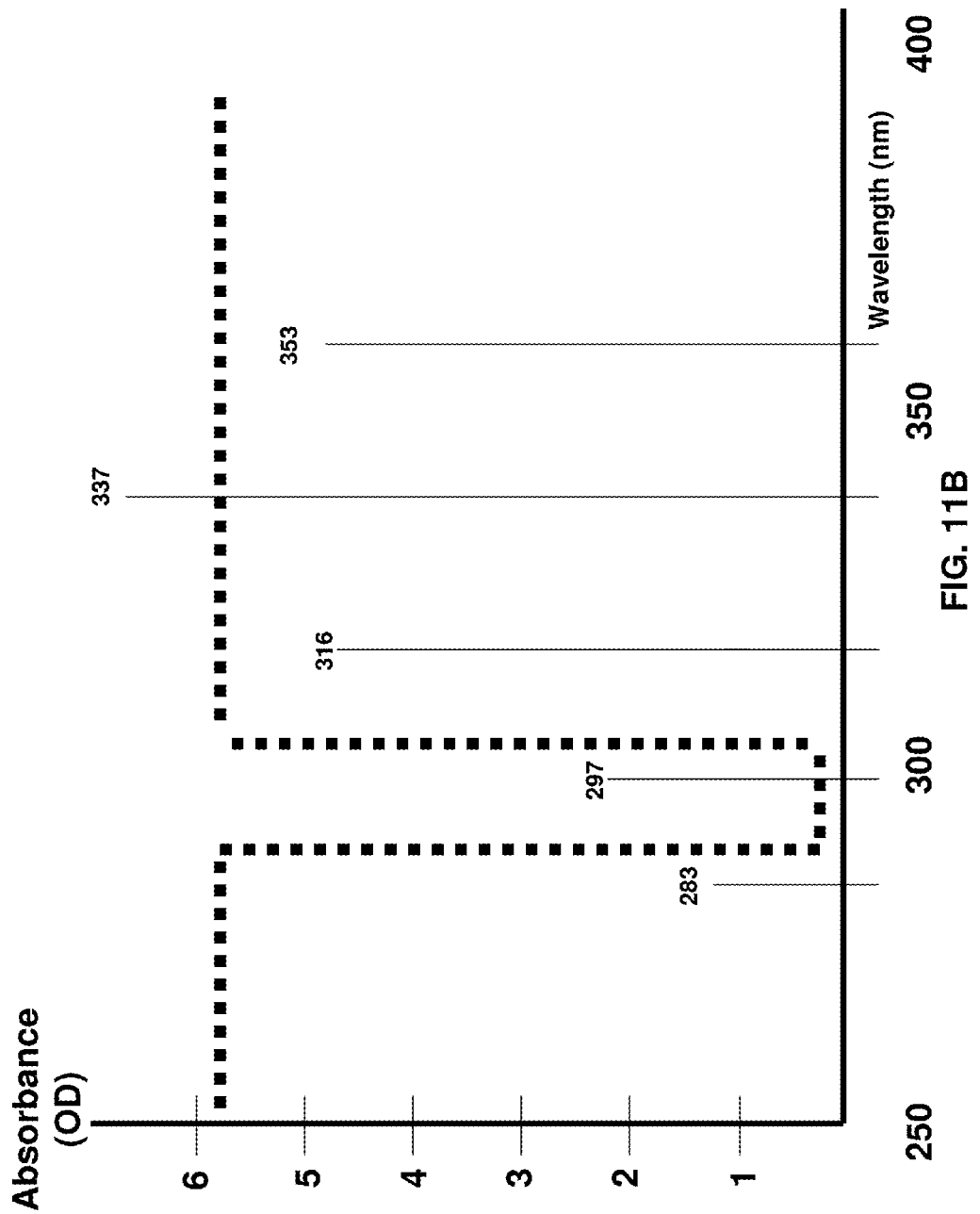
Figure 11C:
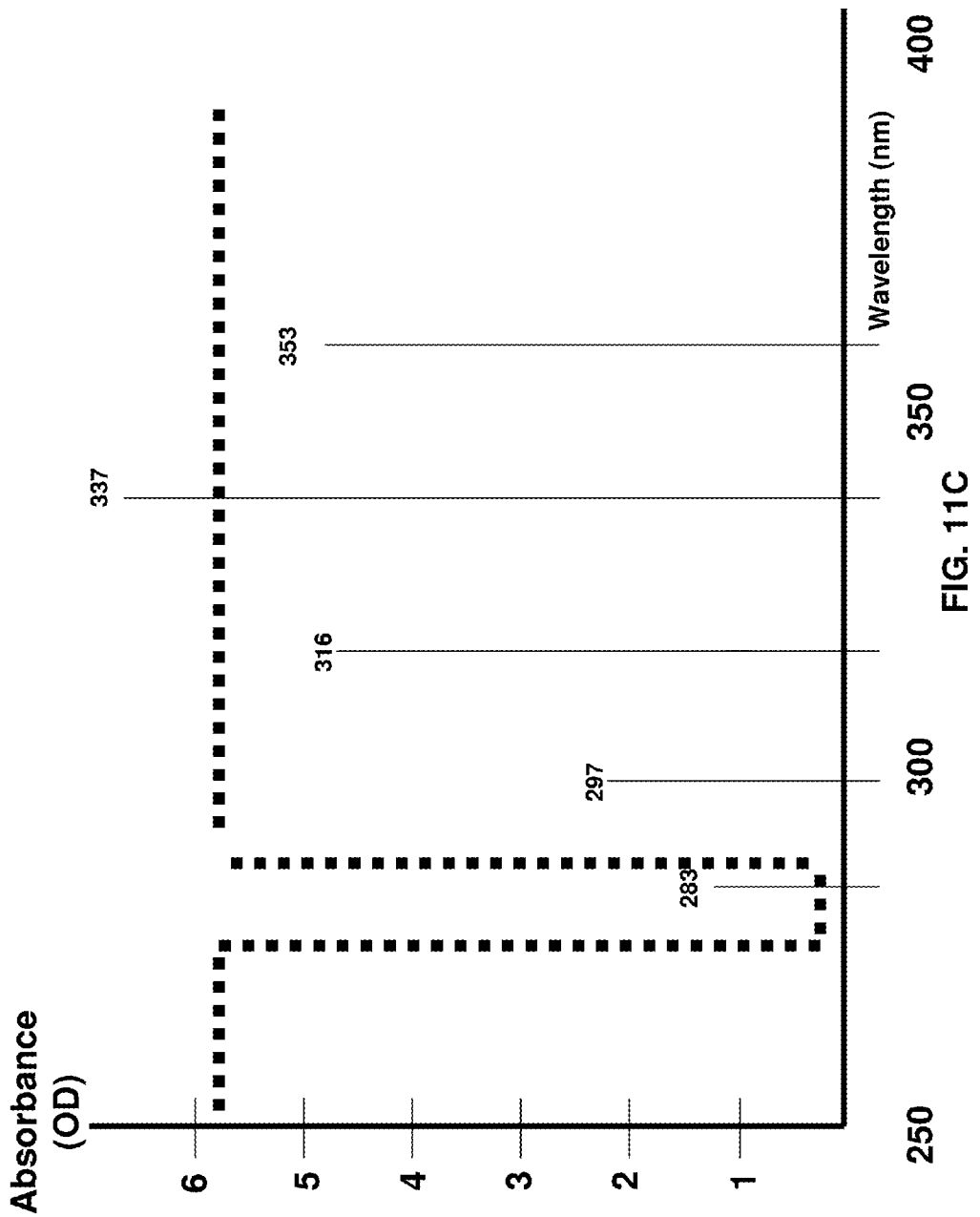
Figure 11D:
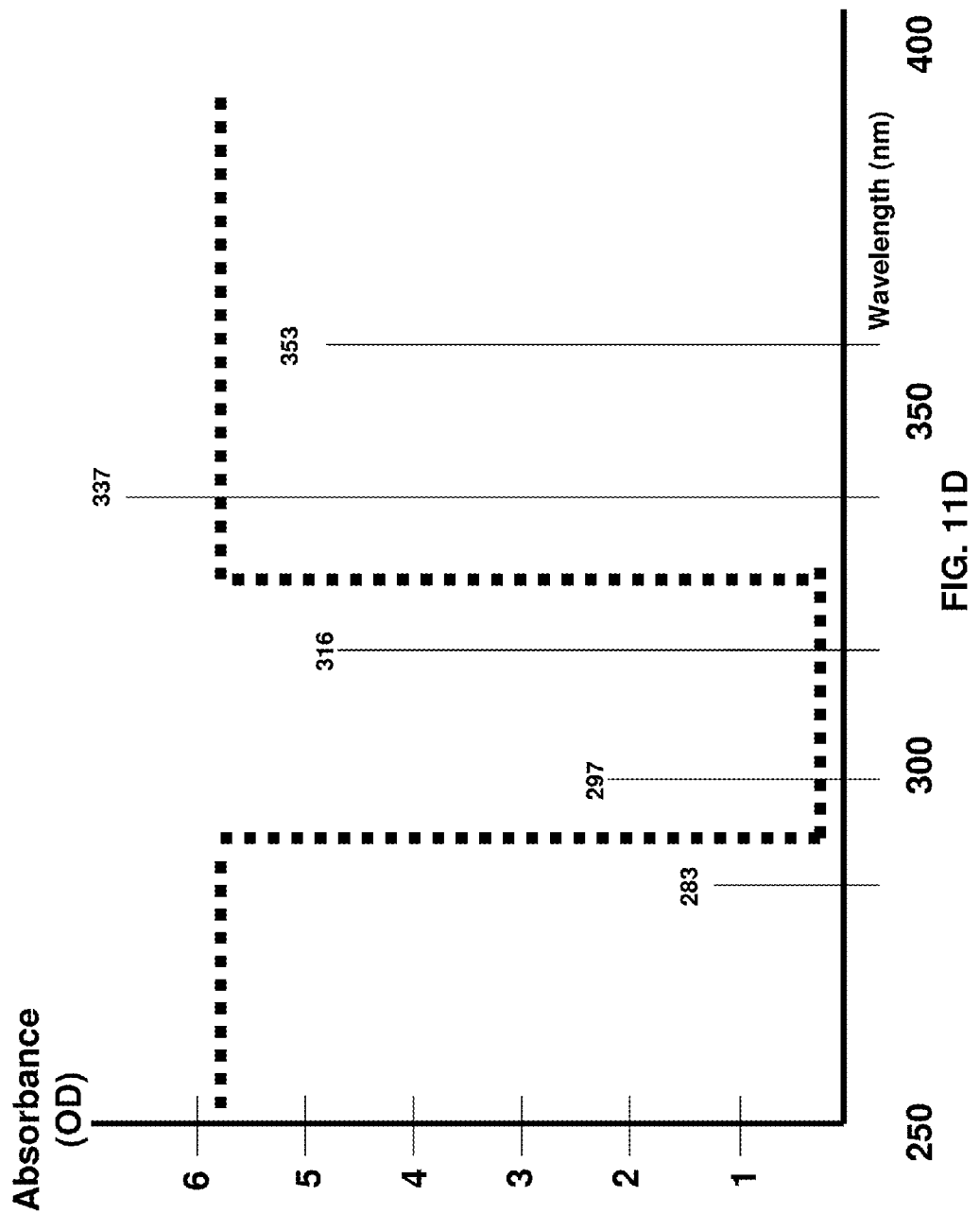
Figure 11E:
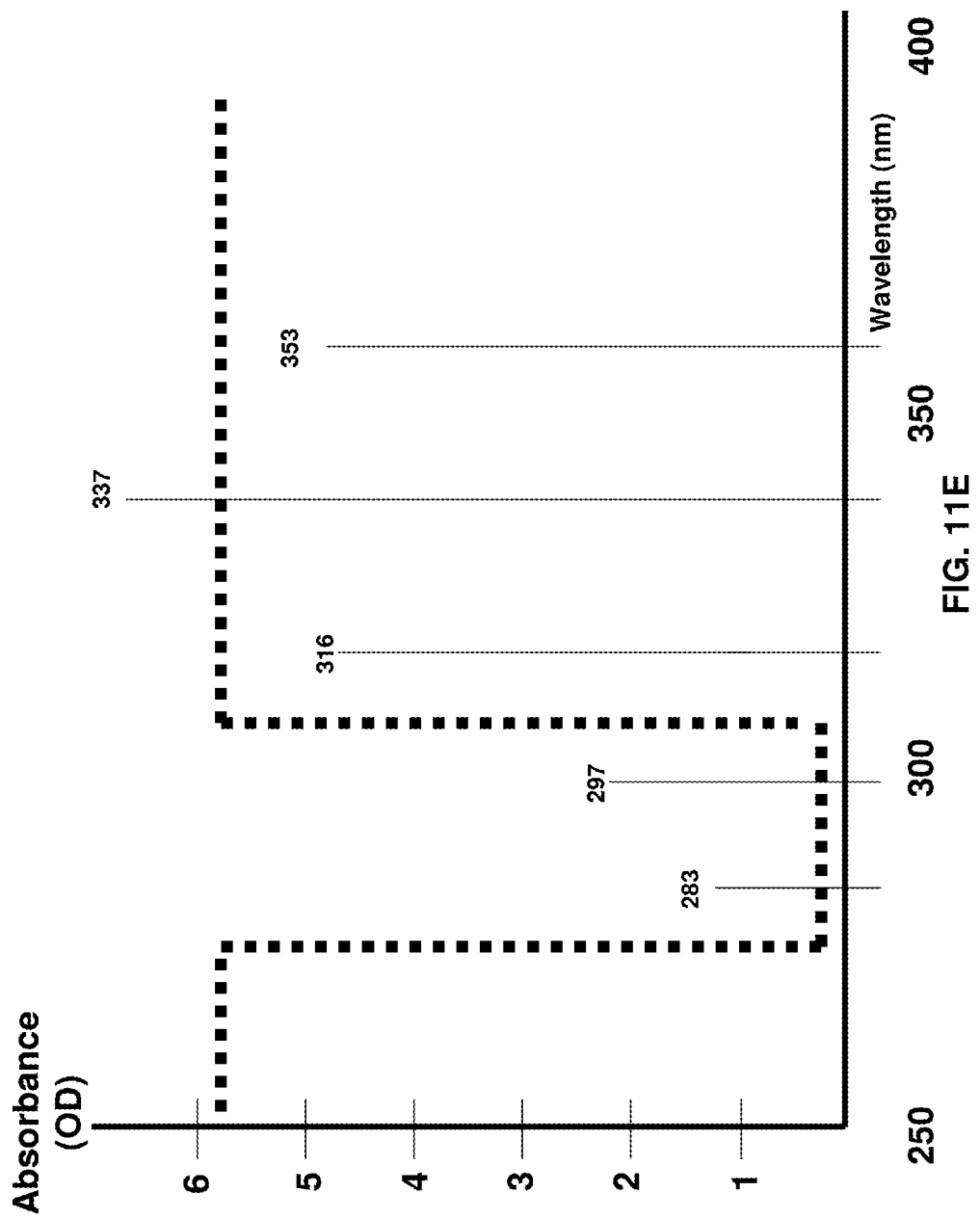

FIG. 10 illustrates one example of a UVB-pixel classification routine in accordance with terrestrial corona-discharges.

In this non-limiting example, the image from unit 400 is first subjected to a threshold algorithm 810 according to a threshold level that is selected according to experimental data about what is an image of a terrestrial corona discharge and what is not (i.e. and thus is noise). Pixels of a first category are brighter than those of the second category—pixels of the first category are made even brighter, while those of the second category are made darker. By judicious selection of a criteria to distinguish between the first and second categories (e.g. based upon experimental data from scenes of or images of terrestrial corona-discharges), the threshold algorithm 810 effectively classifies between corona-discharge pixels and non-corona discharge pixels.

Similarly the shape or brightness of the pixel may vary in time, and the time-integration filter may select between those pixels matching the experimentally-determined pattern, and those which do not—this is algorithm 820.

Similarly, it may be possible to determine if a pixel is a corona-discharge pixel or not from its neighbors—for example, using density filter 830.

In some embodiments, the criteria for determining if a given pixel is a terrestrial-corona pixel or a non-corona-discharge pixel may be adaptive according to an ambient level of non-corona-discharge UVB radiation in the scene 200. For example, on a brighter day, a given pixel is more likely to be noise than corona-discharge, and more rigorous criteria for designating a pixel as discharge may be used. Similarly, in mid-day this may also be the case, compared to early morning or late afternoon. In some embodiments, the pixel classification (and hence the image processing) may change in response to a detected change in an estimate level of ambient non-corona-discharge UVB radiation. For example, at 8 AM a first threshold may be used, and this may automatically be adjusted towards mid-day.

The level of ambient non-corona-discharge UVB radiation may also be determined by analyzing the object-devoid UVB image—for example, according to a density algorithm.

FIGS. 11A-11E illustrate example optical-density profiles in the UVB range for a UVB-corona-peak tuned filter 410. Some or all of the filters of FIGS. 11A-11E may have the property that an average of min [OD($\lambda$),10] over the [280 nm, 700 nm] range is at least 4 or at least 6 or at least 8 or at least 10. For any wavelength, the value of the function min [OD($\lambda$),10] is the minimum of (i) the actual OD value of the filter at the wavelength lambda, and (ii) the number 10.

Figure 12:
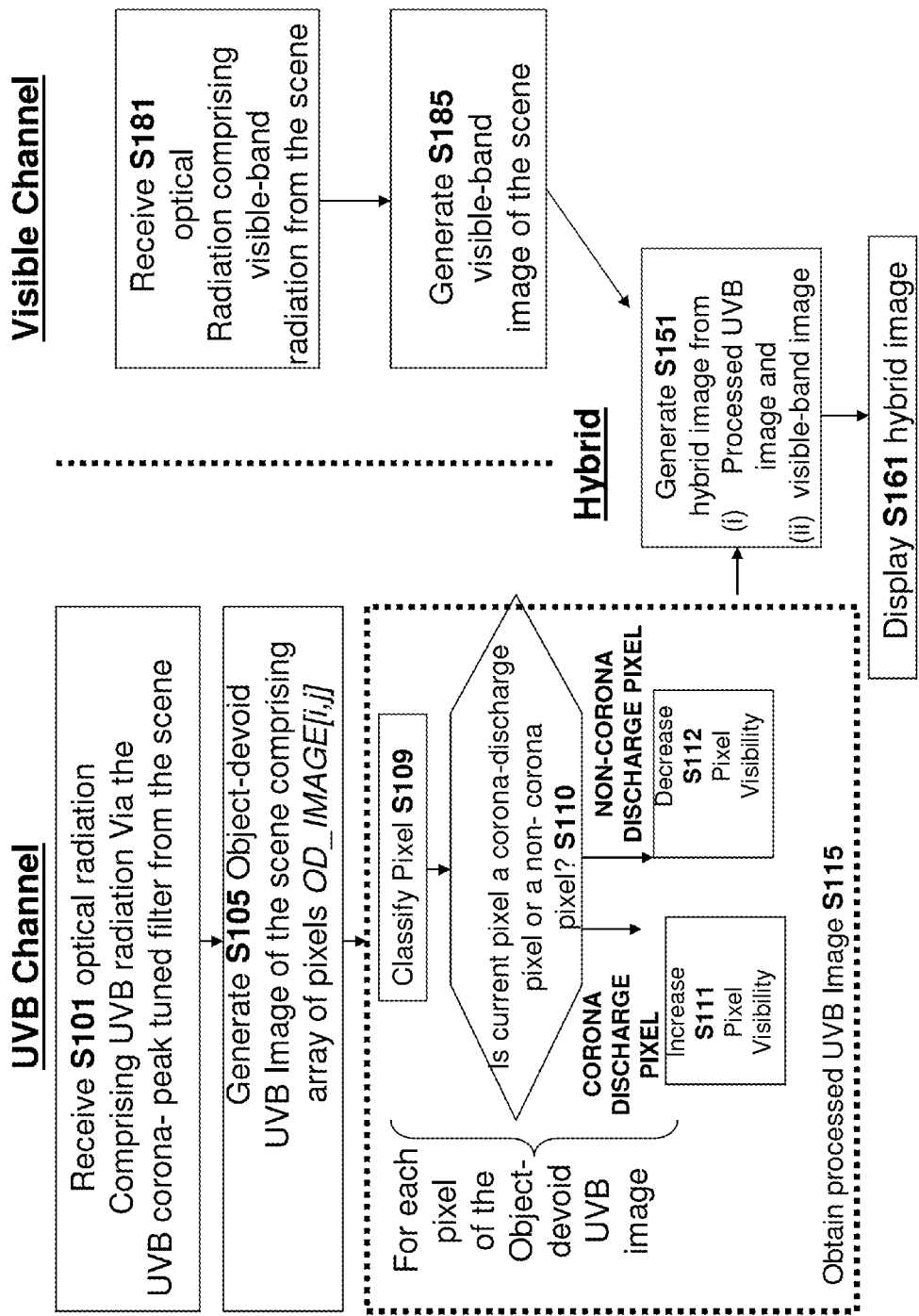
FIG. 12 is a block diagram of an exemplary UVB-visible band hybrid imaging method configured to handle terrestrial-corona discharges.

FIG. 12 illustrates a routine performed by the device of FIG. 4, and includes steps S101, S105, S109, S110, S111, S112, S115, S181, S185, S151, and S161.

DEFINITIONS

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage As discussed above, there is a distinction between an 'object' (e.g. 210 or 220) and a corona-discharge 230A—the former is visible to the naked eye, and the latter is not.

A 'terrestrial corona discharge' is in contrast to solar radiation—ie. the sun also has corona. Non-terrestrial-corona radiation is any UVB radiation other than a terrestrial corona discharge—i.e. solar radiation or superficial sources of UVB radiation such as light bulbs.

Unless otherwise noted, a non-terrestrial-corona discharge is other than a source with 'flashover' such as lightening.

When a scene is 'illuminated' by non-terrestrial-corona radiation, a non-trivial (i.e. other than a trace amount) of non-terrestrial-corona radiation is present—for example, similar to a dark night with a few stars.

A 'corona-discharge pixel' is a pixel that is an image of a terrestrial corona discharge. Every other pixel of a UVB image is a 'non-corona-discharge pixel.'

In the present disclosure 'electronic circuitry' is intended broadly to describe any combination of hardware, software and/or firmware.

Any element disclosed herein may include or be implemented as 'electronic circuitry.' Electronic circuitry may include may include any executable code module (i.e. stored on a computer-readable medium) and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture. Electronic circuitry may be located in a single location or distributed among a plurality of locations where various circuitry elements may be in wired or wireless electronic communication with each other.

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed:

1. A system for visualizing a scene comprising one of more terrestrial corona discharge(s) and one or more objects, the scene illuminated by non-terrestrial-corona-discharge radiation, the system comprising:
   a. Ultraviolet B (UVB) image-generating apparatus configured to generate, from UVB light of the non-terrestrial-corona-discharge-radiation-illuminated scene, an object-devoid UVB image of at least an object-containing portion of the scene, the object-devoid UVB image comprising an image of the corona discharge(s) of the scene and lacking images of all of the scene objects, the UVB image-generating apparatus comprising a wavelength-dependent light filter configured to filter out sufficient non-corona UVB radiation so that generated image is object-devoid, the wavelength-dependent light filter having an optical-density $OD(\lambda)$ profile that satisfies the following conditions:
      i. an average value of min $[OD(\lambda),10]$ over the range [280 nm, 700 nm] is at least x, a value of x being at least 4;
      ii. for at least one wavelength in at least one range selected from the UVB corona-peak range set defined as {[281 nm, 285 nm], [292 nm, 302 nm], [308 nm, 320 nm], [334 nm, 340 nm], [351 nm, 362 nm]}, optical density OD of the filter is at most 1;
   b. UVB image-processing apparatus operative to classify each pixel of the object-devoid UVB image as either a corona-discharge pixel or as a non-corona-discharge pixel and to process the object-devoid image according to the results of the pixel-classifying to generate a UVB processed image;
   c. a visible-band image-generating apparatus configured to generate a visible-band image from visible light of the scene; and
   d. video-display apparatus configured to display a visible band-UVB hybrid image that is a superposition of: (i) the visible-band image or a derivative thereof; and (ii) the UVB processed image or a derivative thereof, the UVB image-processing apparatus configured to perform the image processing so as to increase a visibility of the corona-discharge pixels and/or to decrease a visibility of the non-corona-discharge pixels.

2. The system of claim 1 wherein the UVB image-processing apparatus is configured to respond to a change in an estimated ambient level of non-corona-discharge UVB radiation by modifying a corona-discharge-classification-threshold-function of the pixels to increase the threshold-function in response to an increase in the estimated ambient level and to decrease the threshold-function in response to an estimated decrease in the ambient level.

3. The system of claim 2, configured obtain the estimated intensity of ambient non-corona-discharge UVB radiation in accordance with at least one of: (i) an auxiliary photodetector; (ii) location data; (iii) time-of-day; and (iv) weather data.

4. The system of claim 2, configured estimate the ambient level of non-corona-discharge UVB radiation by analyses of the object-devoid UVB image.

5. The system of claim 1 wherein the pixel classification is performed in accordance with detected temporal variations in the object-devoid UVB image.

6. The system of claim 1 wherein the pixel classification of a target pixel is performed in accordance with analysis of neighboring pixels.

7. The system of claim 1 wherein the pixel classification of a target pixel is performed in accordance with a brightness-thresholding algorithm.

8. The system of claim 1 wherein a value of x is at least 6.

9. The system of claim 1 wherein a value of x is at least 8.

10. The system of claim 1 wherein for at least 5 nm of wavelength over the UVB corona-peak range set, an optical density OD of the filter is at most 1.

11. The system of claim 1 wherein an average value of min $[OD(\lambda),10]$ over the range [400 nm, 700 nm] is at least y, a value of y being at least 4.

12. The system of claim 1 wherein an average value of min $[OD(\lambda),10]$ over the range [280 nm, 400 nm] is at least z, a value of z being at least 4.

13. The system of claim 1 configured to perform the image processing so as to increase a visibility of the corona-discharge pixels.

14. The system of claim 1 configured to perform the image processing so as to decrease a visibility of the non-corona-discharge pixels.

15. The system of claim 1 configured to perform the image processing so as to increase a visibility of the corona-discharge pixels and to decrease a visibility of the non-corona-discharge pixels.

* * * * *